(12) United States Patent
Palmer, Jr.

(10) Patent No.: US 10,934,393 B2
(45) Date of Patent: *Mar. 2, 2021

(54) REACTIVE SURFACTANTS FOR FREEZE-THAW STABLE EMULSION POLYMERS AND COATINGS THEREOF

(71) Applicant: Ethox Chemicals, LLC, Greenville, SC (US)

(72) Inventor: Charles F. Palmer, Jr., Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,728

(22) Filed: Oct. 21, 2012

(65) Prior Publication Data

US 2014/0114006 A1 Apr. 24, 2014

Related U.S. Application Data

(60) Provisional application No. 61/627,067, filed on Oct. 21, 2011.

(51) Int. Cl.

| | | |
|---|---|---|
| *C08G 65/335* | (2006.01) | |
| *C09D 171/02* | (2006.01) | |
| *C08G 65/334* | (2006.01) | |
| *C08G 65/26* | (2006.01) | |
| *C08G 65/14* | (2006.01) | |
| *C08F 2/30* | (2006.01) | |
| *C08F 2/26* | (2006.01) | |

(52) U.S. Cl.
CPC .......... *C08G 65/3351* (2013.01); *C08F 2/26* (2013.01); *C08F 2/30* (2013.01); *C08G 65/14* (2013.01); *C08G 65/2612* (2013.01); *C08G 65/3344* (2013.01); *C09D 171/02* (2013.01)

(58) Field of Classification Search
CPC .................................................. C08F 2/24–30
See application file for complete search history.

(56) References Cited

U.S. PATENT DOCUMENTS

| | | | | |
|---|---|---|---|---|
| 4,221,685 | A  * | 9/1980 | Eschwey et al. ............. | 106/252 |
| 4,814,514 | A  * | 3/1989 | Yokota et al. ................ | 568/608 |
| 6,307,069 | B1 | 10/2001 | Hashimoto et al. | |
| 6,841,655 | B1 * | 1/2005 | Gota et al. ................... | 528/425 |
| 6,933,415 | B2 | 8/2005 | Zhao et al. | |
| 7,906,577 | B2 | 3/2011 | Zong et al. | |
| 9,644,108 | B2 * | 5/2017 | Palmer, Jr. ........... | C09D 113/02 |
| 2009/0186968 | A1 * | 7/2009 | Zong et al. .................. | 524/131 |

* cited by examiner

*Primary Examiner* — Stephen E Rieth
(74) *Attorney, Agent, or Firm* — Joseph T. Guy; Patent Filing Specialist Inc.

(57) ABSTRACT

The invention provides aqueous coating composition having freeze thaw stability, comprising: (a) at least one latex polymer derived from at least one monomer and at least one reactive surfactant of the formula $R_1O—(CH_2CHR_2O)_x—(CH_2CH_2O)_y—(CH_2CHR_3O)_z—R_4$ where $R_1$ is either alkyl, aryl, alkylaryl, or aralkylaryl of 8-30 carbon atoms, $R_2$ is $—CH_2OCH_2CH=CH_2$ (AGE); $R_3$ is either H, $CH_3$, or $CH_2CH_3$; $R_4$ is H or $—SO_3M$ or $—PO_3M$ where M is H or K, Na, $NH_4$, $NR_4$, alkanolamine, or other cationic species and $x=2$-100; $y=4$-200 and $z=0$-50.

9 Claims, No Drawings

REACTIVE SURFACTANTS FOR FREEZE-THAW STABLE EMULSION POLYMERS AND COATINGS THEREOF

This application claims the priority benefit under 35 U.S.C. section 119 of U.S. Provisional Patent Application No. 61/627,967 entitled "New Reactive Surfactants For Freeze-Thaw Stable Emulsion Polymers And Coatings Comprising Them" filed on Oct. 21, 2011, and which is in its entirety herein incorporated by reference.

FIELD OF THE INVENTION

The present invention provides freeze-thaw stable emulsions. The present invention relates to emulsion polymerizing ethylenically unsaturated monomers. This invention also relates to emulsion polymerization of ethylenically unsaturated monomers by using styrenated surfactants containing multiple allyl glycidyl ether groups as the primary emulsifier. The instant invention also relates to a process for the preparation of a polymer dispersion by free radical polymerization of an aqueous monomer emulsion. The present invention further relates to a method for production of waterborne polymer and copolymer dispersions comprising monomer units derived from at least one polymerizable ethylenically unsaturated monomer. The polymer and copolymer dispersions are obtained in a free radical emulsion polymerization process performed in an aqueous media and in the presence of at least one styrenated surfactant containing multiple allyl glycidyl ether groups. In a further aspect, the present invention refers to the use of said polymer or copolymer dispersion. The invention also provides new reactive surfactants for making freeze-thaw stable emulsion polymers and coatings derived therefrom. The instant invention also provides a class of low-VOC waterborne latexes and paints comprising them containing certain reactive surfactants or combination of surfactants that are freeze/thaw stable and that have low particle sizes. The subject invention further relates to a coating composition having a low volatile organic compound content.

BACKGROUND OF THE INVENTION

Emulsion polymerization is the most important industrial method for manufacture of aqueous dispersion polymers. Emulsion polymerization is typically performed in an aqueous medium in the presence of a surfactant and a water-soluble initiator and usually rapidly produces high molecular weight homo or copolymers at high solids content and low dispersion viscosity. Its application requires the emulsification of the monomer in a medium, usually water, through the use of emulsifiers. These are supplied in addition to the other ingredients that go into most polymerizations, such as the initiator and chain transfer agents. The use and type of emulsifier determines many of the characteristics of the produced polymer or copolymer, which is typically a latex (stable colloidal suspension of polymer particles in a continuous phase, usually water). Moreover, the emulsifier usually cannot be completely removed from the latex. For this reason, and because of the great unpredictability of the efficacy of a given surface-active agent as an emulsifier in polymerization, many compounds that would theoretically be useful are not.

It is also known that emulsion polymerization requires the use of a surfactant to form a stable emulsion of monomers and to prevent coagulation of the product polymer. Surfactants are generally categorized into two types: either non-polymerizable, or polymerizable, that is co-polymerizable with the monomers for polymer formation. Surfactants are also categorized as anionic, cationic, non-ionic or zwitterionic depending on their chemical makeup. A problem which has arisen with the use of non-polymerizable surfactants is that they remain as a residue in the product polymer and, as they can be extracted by water, they make the product sensitive to water.

The name "emulsion polymerization" is a misnomer that arises from a historical misconception. Rather than occurring in emulsion droplets, polymerization takes place in the latex particles that form spontaneously in the first few minutes of the process. These latex particles are typically 100 nm in size, and are made of many individual polymer chains. The particles are stopped from coagulating with each other because each particle is surrounded by the surfactant ('soap'); the charge on the surfactant repels other particles electrostatically. When water-soluble polymers are used as stabilizers instead of soap, the repulsion between particles arises because these water-soluble polymers form a 'hairy layer' around a particle that repels other particles, because pushing particles together would involve compressing these chains.

Emulsion polymerization is used to manufacture several commercially important polymers. Many of these polymers are used as solid materials and must be isolated from the aqueous dispersion after polymerization. In other cases the dispersion itself is the end product. A dispersion resulting from emulsion polymerization is often called a latex (especially if derived from a synthetic rubber) or an emulsion (even though "emulsion" strictly speaking refers to a dispersion of an immiscible liquid in water). These emulsions find applications in adhesives, paints, paper coating and textile coatings. They are finding increasing acceptance and are preferred over solvent-based products in these applications as a result of their eco-friendly characteristics due to the absence of VOCs (Volatile Organic Compounds) in them.

Advantages of emulsion polymerization include:

High molecular weight polymers can be made at fast polymerization rates. By contrast, in bulk and solution free radical polymerization, there is a tradeoff between molecular weight and polymerization rate.

The continuous water phase is an excellent conductor of heat and allows the heat to be removed from the system, allowing many reaction methods to increase their rate.

Since polymer molecules are contained within the particles, the viscosity of the reaction medium remains close to that of water and is not dependent on molecular weight.

The final product can be used as is and does not generally need to be altered or processed.

The resulting latex is typically used in coating applications such as paints, stains, etc.

Once the latex-containing product has been applied to a surface as part of a protective or decorative coating, the surfactant is no longer needed. In fact, the presence of the surfactant often degrades the moisture sensitivity of the coating. Other coating properties such as adhesion to the substrate surface can be negatively affected as well. This is largely due to the mobility of the surfactant polymers. For example, locally high concentrations of surfactant molecules can form in the coating from the coalescence of surfactant-coated micelle spheres. When the coating is exposed to water, these unbound surfactant molecules can be extracted from the coating leaving thin spots or pathways to the substrate surface. This can result in a pinholing effect and attack of the substrate by water.

The technique of emulsion polymerization is particularly useful for preparing waterborne latexes which are the bases for many coating systems such as paints and inks. The polymerization reaction takes place in micelles in which the monomer droplet is stabilized by surfactants. The surfactants, usually an anionic or a combination of an anionic and nonionic surfactant, together with polymerization conditions, determine the particle size. Anionic surfactants provide shear stability to prevent loss due to coagulation. Nonionic surfactants provide electrolyte or chemical stability to the growing latex particles. The type and structure of a surfactant can have a dramatic effect on emulsion properties such as particle size, particle size distribution, and latex viscosity. Surfactants are an essential process aid controlling particle size and latex stability during production, handling, storage, application of the latex and finally during drying of the polymer.

However, once the latex-containing product has been applied to a surface as part of a coating, the surfactant is no longer needed. In fact, the presence of the surfactant often degrades the moisture sensitivity of the coating. Other coating properties can be negatively affected as well. This is largely due to the mobility of the surfactant polymers. For example, locally high concentrations of surfactant molecules can form in the coating from the coalescence of surfactant-coated micelle spheres. When the coating is exposed to water, these unbound surfactant molecules can be extracted from the coating leaving thin spots or pathways to the substrate surface. This can result in "blushing" and corrosion of the substrate.

Reactive surfactants contain a polymerizable moiety that can participate in free-radical emulsion polymerization reactions. When used in an emulsion polymerization a large fraction of the surfactant molecules become irreversibly bound to the emulsion polymer chains and droplets. When the latex is then incorporated into a coating such as paint, there is much less free surfactant to interfere with the desired coating properties or to reduce adhesion to the substrate.

A number of reactive nonionic and anionic surfactants are commercially available, including polyoxyethylene alkylphenyl ethers, sodium allyloxy hydroxypropyl sulfonates, alkenyl-functional nonionic surfimers, allyl methoxy triethylene glycol ether, sodium methallyl sulfonates, sulfopropyl acrylate, vinyl sulfonate, vinyl phosphate, monosodium ethylsulfonate monododecyl maleate, sorbitol acrylate, sorbitol methacrylate, perfluoroheptoxy poly(propyloxy) methacrylate, phenoxyl poly(ethyleneoxy) acrylate, phenoxyl poly(ethyleneoxy) methacrylate, nonyl phenoxy poly(ethyleneoxy) crotanate, nonylphenoxy poly (ethyleneoxy) fumarate, nonyl phenoxy poly(ethyleneoxy) acrylate, nonylphenoxy poly(ethyleneoxy) methacrylate, mono dodecyl maleate, and allylsulfosuccinate derivatives.

Additionally, anionic reactive surfactants have been disclosed in Japanese Patent Publication No. 46-12472, Japanese Kokai Patent Publication No. 54-144317, Japanese Patent Publication No. 46-34894, Japanese Patent Publication No. 56-29657, Japanese Kokai Patent Publication No. 51-30285, U.S. Pat. Nos. 4,814,514, and 5,324,862 among others. A review of reactive surfactants may be found in "Reactive Surfactants in Emulsion Polymerization" Guyot, A. and Tauer, K., in Advances in Polymer Science, Vol III, Springer-Verlag, Berlin, pp 43-65.

None of these reactive surfactants incorporate more than one reactive moiety in their structure. In fact, the styrenated phenol-based materials disclosed in U.S. Pat. No. 4,814,514 prepared by the addition of allyl glycidyl ether (AGE) to surfactant base molecules such as hydroxyl-functional fatty alcohols or substituted phenols specifically limit the amount of AGE to 1.0 mole.

Since waterborne coatings are subject to freezing at low temperatures commonly experienced in shipping or storage in northern latitudes, there is significant interest in improving the freeze/thaw stability of latex paints. As a consequence of reducing or eliminating VOCs (volatile organic compounds) in latex paints due to government regulations, ingredients such as propylene glycol (PG), commonly used to help improve freeze/thaw stability, are being eliminated. Many coalescing solvents such as Texanol (IBT) are also being eliminated requiring softer (lower Tg) latexes to be used instead of the traditional harder latexes. Softer latexes have poorer freeze/thaw stability characteristics than higher Tg latexes. It is well known that nonionic surfactants impart varying degrees of freeze/thaw stability to latexes; however, the levels required to impart freeze/thaw stability vary as a function of the Tg of the polymers and the propylene glycol level.

The freeze/thaw stability of waterborne latexes is also related to particle size. Larger particle sizes generally are more stable to freezing. However, for many end use applications, smaller particle size latexes are important for the best coating properties and for best emulsion stability. There is a need for surfactants to provide both freeze/thaw stability and contain a reactive moiety so that the benefits of incorporation into the latex may be gained. In addition, being able to produce lower particle size latexes is desirable.

The use of certain reactive surfactants to impart freeze/thaw stability to paints is disclosed in U.S. Pat. No. 6,933,415. However, the use of these surfactants is only disclosed in paint formulations in which a pigment is present. Pigmented paint formulations include other surfactants that enhance freeze/thaw stability. The use of surfactants to stabilize pigment-free latexes is not disclosed. The particle size of the latexes in the paints is also relatively high. Much lower particle sizes are desirable for most coating applications such as those requiring water resistance in which a reactive surfactant would be used.

Due to the deficiencies of the prior art, and the strong demand for reducing VOCs in coating compositions without sacrificing physical properties, there is an opportunity to provide a coating composition including reactive surfactants that provide freeze-thaw stability/

SUMMARY OF THE INVENTION

The reactive surfactants useful in making the freeze-thaw stable emulsion polymers are selected from the group consisting of formula I, formula II, formula III, formula IV and mixtures thereof.

The reactive surfactant of formula I has the following chemical structure:

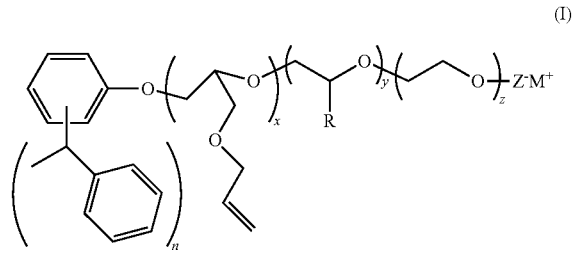

where R=$CH_3$, $CH_2CH_3$, $C_6H_5$, or $C_{14}H_{29}$; n=1, 2, or 3; x is 2-10, y is 0-200, z is 4-200, more preferably from about 5 to 60, and most preferably from about 5 to 40; Z can be either $SO_3^-$ or $PO_3^{2-}$, and $M^+$ is $Na^+$, $K^+$, $NH_4^+$, or an alkanolamine.

The reactive surfactant of formula (II) has the following chemical structure:

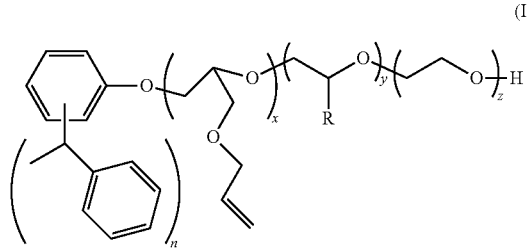

(II)

where R=$CH_3$, $CH_2CH_3$, $C_6H_5$, or $C_{14}H_{29}$; n=1, 2, or 3; x is 2-10, y is 0-200, z is 4-200, more preferably from about 5 to 60, and most preferably from about 5 to 40.

The reactive surfactant of Formula III has the following chemical structure:

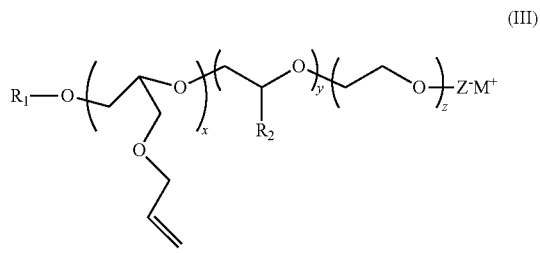

(III)

where $R_1$ is a $C_{10-24}$ alkyl, alkaryl, alkenyl, or cycloalkyl, $R_2$=$CH_3$, $CH_2CH_3$, $C_6H_5$, or $C_{14}H_{29}$; x is 2-10, y is 0-200, z is 4-200, more preferably from about 5 to 60, and most preferably from about 5 to 40; and Z can be either $SO_3^-$ or $PO_3^{2-}$, and $M^+$ is $Na^+$, $K^+$, $NH_4^+$, or an alkanolamine.

The reactive surfactant of formula IV has the following chemical structure:

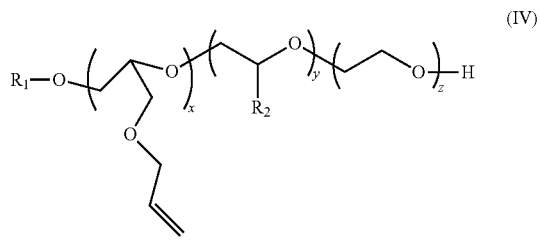

(IV)

where $R_1$ is a $C_{10-24}$ alkyl, alkaryl, alkenyl, or cycloalkyl, $R_2$=$CH_3$, $CH_2CH_3$, $C_6H_5$, or $C_{14}H_{29}$; x is 2-10, y is 0-200, z is 4-200, more preferably from about 5 to 60, and most preferably from about 5 to 40.

The instant invention also provides a class of low-VOC waterborne latexes and paints comprising them containing certain reactive surfactants or combination of surfactants that are freeze/thaw stable and that have low particle sizes. The amount of reactive surfactant required to obtain freeze/thaw stability is much lower than that of added freeze/thaw stability additives. The reactive surfactants of the invention work with latexes of varying Tg.

These new reactive surfactants are copolymers of one or more moles of allyl glycidyl ether (AGE) and ethylene oxide terminated on one end with a styrenated phenol moiety. The addition of a second equivalent of AGE significantly reduces the amount of non-reactive surfactant in the product so that increases in coating repellency may be achieved.

Styrenated phenol is a generic term for a mixture of substituted phenols. Phenol is substituted with one, two, or three —$CH(CH_3)C_6H_5$ units derived from styrene. The ratio of mono-, di-, and tristyrenated phenol may be varied according to manufacturing conditions. Distyrenated phenol (DSP) contains significant fractions of mono- and tristyrenated phenol.

Other monomers may be included in the copolymer along with AGE and EO. These include propylene oxide (PO) and other epoxides such as 1,2-butylene oxide, styrene oxide, or 1,2-tetradecane oxide.

Varying the level of ethoxylation or propoxylation and adjusting the size of the hydrophobe results in being able to tune the structure for optimal performance in different latex polymerizations. The addition of some propylene oxide to the poly(ethylene oxide) chain modifies its hydrophilic character and foaming properties.

These nonionic copolymers may be optionally further derivatized to convert them to anionic surfactants. Examples of these include sulfates, sulfonates, phosphate esters, and carboxylates.

Generally, the latex particles can be prepared by mixing monomers together to form a monomer mixture. A surfactant or surfactants is (are) then added to the monomer mixture and sheared into water which optionally includes some portion of the surfactant to form an emulsion. The surfactant(s) may include a reactive surfactant, a nonreactive surfactant, or a combination of reactive and nonreactive surfactants.

These latexes may be formulated into coatings by the optional inclusion of pigments, antioxidants, water, and other additives desired for the target end use.

These new surfactants impart improved properties to coatings comprising latexes prepared with these novel surfactants. These properties include low particle size, improved water repellency, freeze-thaw stability, and improved gloss, water resistance, and other ink and coating properties.

The present invention further includes a method of preparing an aqueous coating composition, comprising the step of preparing the polymer latex binder using emulsion polymerization by feeding monomers to a reactor in the presence of at least one initiator and the at least one reactive surfactant as described above and polymerizing the monomers and the polymerizable surfactant to produce the latex binder. Pigments and other additives can then be mixed with the resulting latex binder to produce the aqueous coating composition. The step of preparing the polymer latex binder can include preparing an initiator solution comprising the initiator, preparing a monomer pre-emulsion comprising monomers and the polymerizable reactive surfactant of the present invention, adding the initiator solution to a reactor, and adding the monomer pre-emulsion to the reactor. The incorporation of the reactive surfactants in the polymer latex enables the coating composition to have a lower VOC content while maintaining the freeze-thaw stability of the aqueous coating composition at desirable levels.

The invention further provides aqueous coating composition having freeze thaw stability, comprising: (a) at least one latex polymer derived from at least one monomer and at least one reactive surfactant of the formula

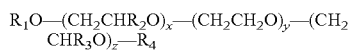

where $R_1$ is either alkyl, aryl, alkylaryl, or aralkylaryl of 8-30 carbon atoms, $R_2$ is —$CH_2OCH_2CH$=$CH_2$ (AGE); $R_3$ is either H, $CH_3$, or $CH_2CH_3$; $R_4$ is H or —$SO_3M$ or —$PO_3M$ where M is H or K, Na, $NH_4$, $NR_4$, alkanolamine, or other cationic species and x=2-100; y=4-200 and z=0-50.

DETAILED DESCRIPTION OF THE PREFERRED EMBODIMENTS

The present invention is directed to novel reactive surfactants, the use of the surfactants in emulsion polymerization to prepare freeze-thaw stable emulsions and the use of the resulting compositions.

The invention provides reactive surfactants having the following formulas:

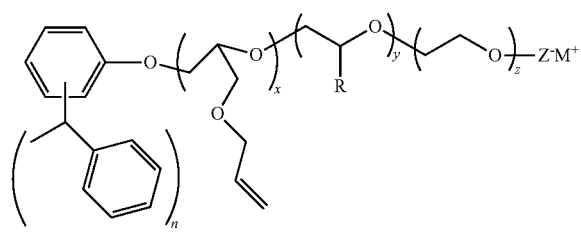
(I)

where R=$CH_3$, $CH_2CH_3$, $C_6H_5$, or $C_{14}H_{29}$; n=1, 2, or 3; x is 2-10, y is 0-200, z is 4-200, more preferably from about 5 to 60, and most preferably from about 5 to 40; Z can be either $SO_3^-$ or $PO_3^{2-}$, and $M^+$ is $Na^+$, $K^+$, $NH_4^+$, or an alkanolamine;

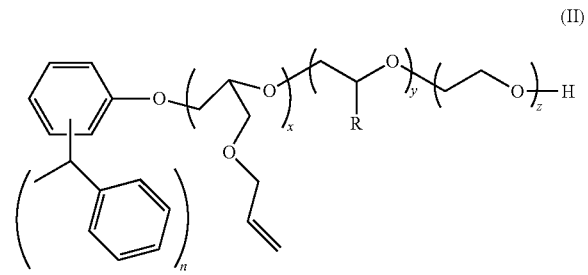
(II)

where R=$CH_3$, $CH_2CH_3$, $C_6H_5$, or $C_{14}H_{29}$; n=1, 2, or 3; x is 2-10, y is 0-200, z is 4-200, more preferably from about 5 to 60, and most preferably from about 5 to 40;

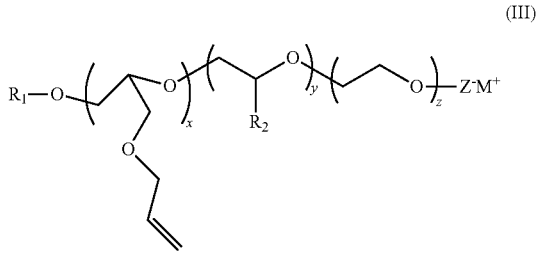
(III)

where $R_1$ is a $C_{10-24}$ alkyl, alkaryl, alkenyl, or cycloalkyl, $R_2$=$CH_3$, $CH_2CH_3$, $C_6H_5$, or $C_{14}H_{29}$; x is 2-10, y is 0-200, z is 4-200, more preferably from about 5 to 60, and most preferably from about 5 to 40; and Z can be either $SO_3^-$ or $PO_3^{2-}$, and $M^+$ is $Na^+$, $K^+$, $NH_4^+$, or an alkanolamine; and

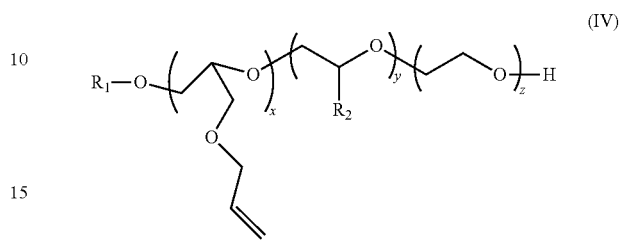
(IV)

where $R_1$ is a $C_{10-24}$ alkyl, alkaryl, alkenyl, or cycloalkyl, $R_2$=$CH_3$, $CH_2CH_3$, $C_6H_5$, or $C_{14}H_{29}$; x is 2-10, y is 0-200, z is 4-200, more preferably from about 5 to 60, and most preferably from about 5 to 40.

The reactive surfactants are manufactured by reacting one equivalent of either the di- or tri-styrenated phenol or other hydroxyl containing materials with 2 or more equivalents of allyl glycidyl ether in an autoclave using potassium hydroxide catalyst at a temperature in the range of 100-110 C to produce an adduct having at least two equivalents of allyl glycidyl ether. The resulting adduct is then reacted with an alkylene oxide, mixtures of alkylene oxides and styrene oxide in the presence of a basic catalyst such as potassium hydroxide or an alkali metal alkoxide such as sodium or potassium methoxide.

More specifically the process for alkoxylation includes the steps of: adding the catalyst to the organic compound containing at least one hydroxyl group; heating and pressurizing a reactor containing the hydroxyl containing organic compound; supplying alkylene oxide to said organic compound and catalyst at a process temperature of between 50° and 250° C. and at a pressure of between 100 and 700 kPa and isolating the alkoxylation products.

The alkylene oxides useful for the alkoxylation reaction are selected from the group consisting of ethylene oxide, propylene oxide, butylenes oxide, $C_5$-$C_{18}$ oxides and styrene oxide. The alkylene oxide groups may be arranged at random or in blocks. Particular preference is given to block arrangements with fairly hydrophobic groups such as propylene oxide or, butylene oxide. The ratio of the molar amounts of the ethylene oxide groups to the other hydrophobic alkylene oxide groups is adjusted as necessary to achieve the desired properties.

The performance properties of the novel reactive surfactants of the invention may be optimized for a specific application by appropriate modification such as the degree of alkoxylation and the different alkylene oxides that are used, and the choice of group used as an end cap. The interplay between these factors appears to be complex and is not well-understood. However, it is clear that manipulation of these variables allows access to materials which can perform as excellent emulsifiers.

The present invention is also directed towards the emulsion polymerization of ethylenically unsaturated monomers in the presence of an anionic surfactant of formula (I)

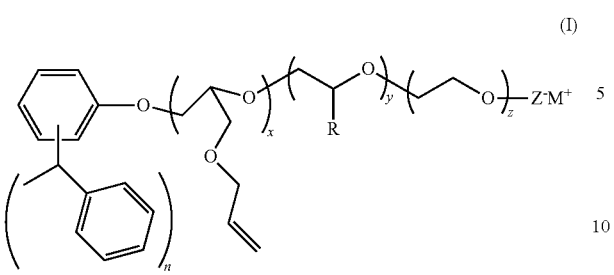

(I)

where R=CH$_3$ or CH$_2$CH$_3$, n=1, 2, 3; x is 2-10, y is 0-200, z is 4-200 more preferably from about 5 to 60, and most preferably from about 5 to 40; Z can be either SO$_3^-$ or PO$_3^{2-}$, and M$^+$ is Na$^+$, K$^+$, NH$_4^+$, or an alkanolamine.

The present invention also provides emulsion polymerization of ethylenically unsaturated monomers in the presence of a nonionic surfactant of formula (II)

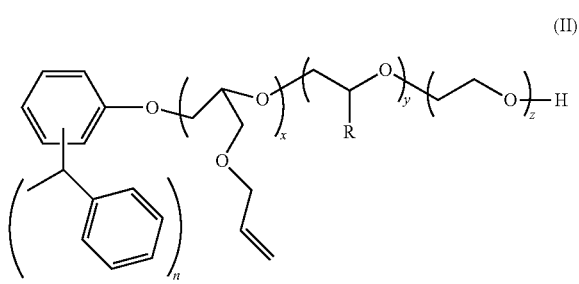

(II)

where R=CH$_3$ or CH$_2$CH$_3$, n=1, 2, 3; x is 2-10, y is 0-200, z is 4-200 more preferably from about 5 to 60, and most preferably from about 5 to 40.

In another embodiment, the present invention is further directed towards the emulsion polymerization of ethylenically unsaturated monomers in the presence of a surfactant of formulae (III) or (IV).

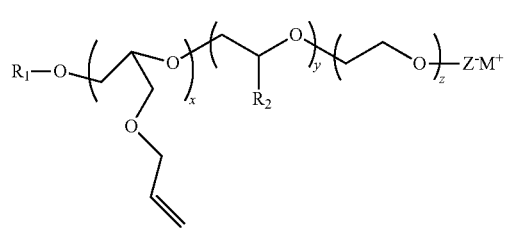

(III)

where R$_1$ is a C10-24 alkyl, alkaryl, alkenyl, or cycloalkyl, R$_2$=CH$_3$, CH$_2$CH$_3$, C$_6$H$_5$, or C$_{14}$H$_{29}$; x is 2-10, y is 0-200, z is 4-200, more preferably from about 5 to 60, and most preferably from about 5 to 40. Z can be either SO$_3^-$ or PO$_3^{2-}$, and M$^+$ is Na$^+$, K$^+$, NH$_4^+$ or an alkanolamine;

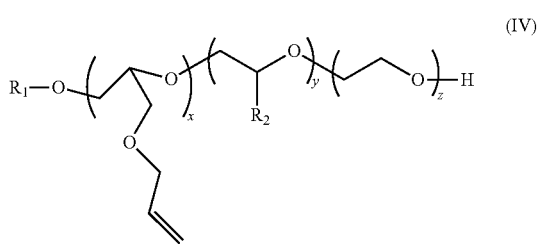

(IV)

where R1 is a C10-24 alkyl, alkaryl, alkenyl, or cycloalkyl, R$_2$=CH$_3$, CH$_2$CH$_3$, C$_6$H$_5$, or C$_{14}$H$_{29}$; x is 2-10, y is 0-200, z is 4-200, more preferably from about 5 to 60, and most preferably from about 5 to 40.

The compounds of formulas (I)-(IV) may be used separately or in combination in the emulsion polymerization or further in combination optionally in the presence of other surfactants selected from the group consisting of nonionic, anionic, cationic and zwitterionic surfactants. When used in combination, the ratio of compounds of formulae (I) to (IV) is not limited but is dictated by the desired emulsion properties. Surfactants of formulas (I) to (IV) may also be used in combination with other surfactants that are commonly used in the art. When used in combination, the ratio of surfactants is not specific but is commonly optimized based on the nature of the ethylenically unsaturated monomers present in a given formulation.

The total amount of surfactants of formulas (I) to (IV) that may be used in the present invention is preferably from about 0.1% to about 20% based on total weight of the monomer, more preferably from about 0.2% to about 10%, and most preferably from about 0.5% to about 7% based on the total weight of the monomer. The compounds of formulas (I) to (IV) may also be used in combination with conventional surfactants in order to improve emulsion properties.

Other surfactants that are commonly used in the emulsion polymerization process include both anionic and nonionic molecules. Commonly utilized anionic surfactants in the emulsion polymerization process include sodium alkylbenzene sulfonates, alkyldiphenyloxide disulfonates, ethoxylated alkylphenol sulfates and phosphates, alkyl sulfosuccinates, and sulfates and phosphates of fatty alcohols, etc. Commonly utilized nonionic surfactants include linear and branched alcohol ethoxylates, and alkylphenol ethoxylates, particularly octylphenol ethoxylates. When used in combination with other surfactants the ratios are not limited but are also dictated by the desired emulsion properties.

Suitable monomers that may be polymerized by the practice of the present invention include numerous ethylenically unsaturated monomers such as vinyl monomers or acrylic monomers. Typical vinyl monomers suitable for use in accordance with the present invention include, but are not limited to, vinyl esters such as vinyl acetate, vinyl propionate, vinyl benzoate, etc; vinyl aromatic hydrocarbons such as styrene, methyl styrenes, other vinyl aromatics such as vinyl toluenes, vinyl napthalenes, divinyl benzene, etc. Halogenated vinyl monomers such as vinyl chloride, vinylidene chloride, etc. may also be used.

Suitable acrylic monomers which may be used in accordance with the present invention comprise compounds with acrylic functionality such as alkyl acrylates and methacrylates, acrylate acids and methacrylate acids as well as acrylamides and acrylonitirle. Typical acrylic monomers include, but are not limited to methyl acrylate and methyl methacrylate, ethyl, propyl, and butyl acrylate and methacrylate, benzyl acrylate and methacrylate, cyclohexyl acrylate and methacrylate, decyl and dodecyl acrylate and methacrylate, etc. Other typical acrylic monomers include hydroxy alkyl acrylates and methacrylates such as hydroxypropyl and hydroxyethyl acrylate and methacrylate, acrylic acids such as methacrylic and acrylic acid, and amino acrylates and methacrylates. It will be recognized by those familiar with the art that other unsaturated monomers which are suitable for free radical addition polymerization may also be used in accordance with the present invention.

Numerous free radical forming compounds are utilized as catalysts in the emulsion polymerization process. Typically compounds used as catalysts are those that from free radicals via thermal decomposition, referred to in the art as "thermal initiators" or combinations of compounds that form free radicals via oxidation/reduction reactions. Such catalysts are combinations of an oxidizing agent and a reducing agent and are commonly referred to in the art as "redox initiators." Either thermal or redox catalysts may be used in the practice of the present invention.

Typical catalysts utilized as thermal initiators include persulfates, specifically potassium persulfate, sodium persulfate, ammonium persulfate and the like. Typical redox initiators include combinations of oxidizing agents or initiators such as peroxides, specifically benzoyl peroxide, t-butyl hydroperoxide, lauryl peroxide, hydrogen peroxide, 2,2'-diazobisiso-butyronitrile, and the like. Typical reducing agents include sodium bisulfite, sodium formaldehyde sulfoxylate, sodium hydrosulfite, and ascorbic and isoascorbic acid. The catalyst or initiator is employed in an amount preferably from 0.1 to 3 weight percent of the total monomer weight, and most preferably from about 0.1 to 1 weight percent of the total monomer charge.

Other additives or components which are known to those skilled in the art may also used in accordance with the present invention. These include chain transfer agents, which are used to control molecular weight, additives to adjust pH, and compounds utilized as protective colloids which provide additional stability to the latex particles.

The typical ingredients used in an emulsion polymerization are listed in the following generalized recipe:

| Component | %-Wet Basis |
|---|---|
| Monomers | 30-50 |
| Surface-active agents | 1-3 |
| Protective colloid | 0-3 |
| Initiator | 1-3 |
| Modifier | 0-1 |
| Buffer | 0-1 |
| Water | 50-70 |

The emulsifiers suspend monomer droplets and polymer particles. Modifiers may be aldehydes, mercaptans or chlorinated hydrocarbons that control the polymerization reaction restricting cross-linking and controlling the molecular weight. Protective colloids, such as polyvinyl alcohol or methyl cellulose, are used to stabilize the final latex. Buffer salts control the pH of the emulsion polymerization batch. These salts, such as phosphates, citrates, acetates and carbonates, are important because pH affects reaction rate, particle size and other reaction conditions.

In some cases the monomer emulsion is seeded with polymer particles. The purpose of seeded emulsion polymerization is to avoid the uncertainties of the particle initiation stage, obtain better batch-to-batch reproducibility, and give a stable latex of the desired particle size. The reasons for polymerizing in water include: more rapid polymerization than bulk polymerization at the same temperature with a greater average molecular weight; good heat transfer in water with better control of heat of polymerization; all of the monomer is consumed in the polymerization and the resulting latex can be used directly in coating applications; and the aqueous phase lowers the overall viscosity of the emulsion.

The monomer emulsion is made up of water-immiscible monomer droplets stabilized by surfactant molecules, empty micelles (colloidal surfactant vesicles) and monomer-swollen micelles. The monomer droplets can range in size from less than one micrometer to ten micrometers. The size of micelles is about 10 to 15 nanometers. During the reaction, the monomer molecules diffuse from the droplet reservoirs to the micelles where polymerization takes place. The polymer chains grow in the micelles. As polymerization proceeds, the monomer droplets decrease in size and eventually disappear. When the polymer particles become large, the surfactant molecules in the micelles suspend the polymer particles. The final polymer particles grow to a size range of a few tenths of a micrometer up to one micrometer. The physical character of the final polymer depends on the temperature of reaction, the formulation and the manipulation of the reaction conditions, such as when and how much of the ingredients are added to the reactor.

A homogenizer is used in emulsion polymerization to emulsify the monomer into the premix to the reactor. Of all the emulsion monomers, vinyl chloride polymerization is the one that most commonly uses homogenizers to prepare the mix. In a typical process the ingredients to make the polymer are added in the appropriate sequence to an evacuated, agitated, pressurized tank (pressurized with nitrogen gas). After mixing the ingredients and adjusting the temperature of the mix, the emulsion is homogenized to produce the desired monomer droplet size. The homogenizing pressure may be in the range of 1000 to 5000 psi, depending on the monomer and the required droplet size of the monomer reservoir. This monomer droplet size can affect the physical character of the final latex particles. From the homogenizer the emulsion goes to the reactor, where polymerization occurs at a controlled temperature, until the desired conversion is achieved. After completion of the reaction, the latex is cooled and removed from the reactor.

Any other of the conventional methods employed in the emulsion polymerization process may also be used in accordance with the present invention. These include both standard and pre-emulsion monomer addition techniques as well as staged monomer addition.

EXAMPLES

Example 1

Distyrenated phenol (DSP) (694 g, 1 equivalent) was added to a stainless steel autoclave along with allyl glycidyl ether (AGE) (494 g, 2 equivalents) and potassium hydroxide KOH (2.3 g) and the autoclave sealed and heated to 105 C. When all of the AGE was consumed, the reaction mass was cooled, and the product discharged. This is AGE 2 DSP adduct.

1680 g of this AGE 2 DSP adduct (1 equivalent) was added to another autoclave and heated to 105 C. Ethylene oxide (2026 g, 15 equivalents) was then added over the course of several hours. After all of the EO was consumed, the reaction mass was cooled and the catalyst neutralized with the addition of a small amount of acid. This material is Example 1. This material is also referred to as ERS 1617. This material is also known as ERS 1617.

Example 1A

Distyrenated phenol (DSP) (1388 g, 2 equivalent) was added to a stainless steel autoclave along with allyl glycidyl ether (AGE) (988 g, 4 equivalents) and potassium hydroxide KOH (4.6 g) and the autoclave sealed and heated to 105 C. When all of the AGE was consumed, the reaction mass was cooled, and the product discharged. This is AGE 2 DSP adduct.

3360 g of this AGE 2 DSP adduct (2 equivalents) was added to another autoclave and heated to 105 C. Ethylene oxide (4052 g, 30 equivalents) was then added over the course of several hours. After all of the EO was consumed, the reaction mass was cooled and the catalyst neutralized with the addition of a small amount of acid.

Example 1B

Distyrenated phenol (DSP) (347 g, 0.5 equivalent) was added to a stainless steel autoclave along with allyl glycidyl ether (AGE) (247 g, 1 equivalents) and potassium hydroxide KOH (1.15 g) and the autoclave sealed and heated to 105 C. When all of the AGE was consumed, the reaction mass was cooled, and the product discharged. This is AGE 2 DSP adduct.

940 g of this AGE 2 DSP adduct (0.5 equivalent) was added to another autoclave and heated to 105 C. Ethylene oxide (1013 g, 7.5 equivalents) was then added over the course of several hours. After all of the EO was consumed, the reaction mass was cooled and the catalyst neutralized with the addition of a small amount of acid.

Example 1C

Distyrenated phenol (DSP) (2776 g, 4 equivalent) was added to a stainless steel autoclave along with allyl glycidyl ether (AGE) (1976 g, 8 equivalents) and potassium hydroxide KOH (9.2 g) and the autoclave sealed and heated to 105 C. When all of the AGE was consumed, the reaction mass was cooled, and the product discharged. This is AGE 2 DSP adduct.

6720 g of this AGE 2 DSP adduct (4 equivalents) was added to another autoclave and heated to 105 C. Ethylene oxide (8104 g, 60 equivalents) was then added over the course of several hours. After all of the EO was consumed, the reaction mass was cooled and the catalyst neutralized with the addition of a small amount of acid.

Example 2

Example 1 was sulfated with sulfamic acid in a glass reactor equipped with a stirrer, thermometer, and reflux condenser by heating to 120 C until the % sulfate was >90%. The product, Example 2, was isolated as the ammonium salt. The product is also known as ERS 1618.

Example 2A

Three moles of Example 1 was phosphated with one mole of phosphorus pentoxide ($P_2O_5$) in a glass reactor equipped with a stirrer, thermometer, and reflux condenser by heating to 70 C until the reaction was complete. The product phosphoric acid ester, a mixture of mono- and diesters, was neutralized with aqueous ammonium hydroxide. The product was isolated as the ammonium salt in aqueous solution.

In a procedure similar to Examples 1, 2, or 2A, examples 2B to 2V—were prepared:

Examples 2B-2V

| Example No. | Hydrophobe | AGE (equivalents) | EO (equiv) | Terminal group |
|---|---|---|---|---|
| 2B | DSP | 1 | 16 | —OH |
| 2C | DSP | 1 | 16 | —$OSO_3^-$ $NH_4^+$ |
| 2D | DSP | 2 | 15 | —$OSO_3^-$ $NH_4^+$ |
| 2E | DSP | 2 | 15 | —$OPO_3^-$ $NH_4^+$ |
| 2F | DSP | 2 | 15 | —$OPO_3^-$ $K^+$ |
| 2G | Tridecyl alcohol | 1 | 17 | —OH |
| 2H | Tridecyl alcohol | 1 | 17 | —$OSO_3^-$ $NH_4^+$ |
| 2I | Tridecyl alcohol | 2 | 36 | —OH |
| 2J | Tridecyl alcohol | 2 | 36 | —$OPO_3^-$ $NH_4^+$ |
| 2K | Nonylphenol | 2 | 4 | —OH |
| 2L | Nonylphenol | 2 | 4 | —$OSO_3^-$ $NH_4^+$ |
| 2M | Nonylphenol | 2 | 38 | —OH |
| 2N | Nonylphenol | 2 | 38 | —$OSO_3^-$ $NH_4^+$ |
| 2O | DSP | 2 | 15 | —$OSO_3^-$ $NH_4^+$ |
| 2P | DSP | 1 | 5 | —OH |
| 2Q | DSP | 1 | 5 | —$OSO_3^-$ $NH_4^+$ |
| 2R | DSP | 2 | 5 | —$OSO_3^-$ $NH_4^+$ |
| 2S | TSP | 1 | 10 | —OH |
| 2T | TSP | 1 | 10 | —$OSO_3^-$ $NH_4^+$ |
| 2U | TSP | 2 | 10 | —OH |
| 2V | TSP | 2 | 10 | —$OSO_3^-$ $NH_4^+$ |

Examples 3-65

1) Surfactants
   a) Example 1—POE(15) {DSP/2 AGE} nonionic (ERS 1617)
   b) Example 2—POE(15) {DSP/2 AGE} Sulfate, ammonium salt (ERS 1618)
   c) E-Sperse® 704—POE(20) DSP Sulfate, ammonium salt available from Ethox Chemicals, Greenville, S.C., USA
   d) E-Sperse®® 703—POE(20) DSP available from Ethox Chemicals, Greenville, S.C., USA
   e) ERS 1689—POE (10) TSP available from Ethox Chemicals, Greenville, S.C., USA
   f) SLS (sodium lauryl sulfate)

DSP is a mixture of mono-, di- and tristyrenated phenols with distyrenated phenol the major component; TSP is tristyrenated phenol; AGE is allyl glycidyl ether; POE is poly(oxyethylene) and the number following is the equivalents of added ethylene oxide These surfactants were used to make emulsion polymers with a Tg of either 15 C, 5 C, −5 C, or −35 C. The Tg was adjusted by varying the amount of butyl acrylate used in the recipe according to the Fox equation for estimating the Tg of copolymers. The general recipe is as follows:

TABLE 1

| Latex Recipe | | | |
|---|---|---|---|
| Material | Weight | Purity | Solids |
| Initial Charge | | | |
| Water (DI) | 337.3 | 0.00 | 0.0 |
| Sodium Bicarbonate | 6.00 | 1.00 | 6.0 |
| Seed Latex - 190 nm | 107.0 | 0.31 | 32.6 |
| Sub Total | 450.3 | | 38.6 |
| Initial Oxidizer | | | |
| Ammonium Persulfate | 2.30 | 1.00 | 2.3 |
| Water (DI) | 60.00 | 0.00 | 0.0 |
| Sub Total | 62.3 | | 2.3 |
| Monomer Feed 1 | | | |
| Water (DI) | 286.30 | 0.00 | 0.0 |
| 1$^{st}$ Surfactant | 17.40 | 0.50 | 8.7 |
| 2$^{nd}$ surfactant | 8.68 | 1.00 | 8.7 |
| Butyl Acrylate | 450.0 | 1.00 | 450.0 |
| Methyl Methacrylate | 350.0 | 1.00 | 350.0 |
| Methacrylic Acid | 8.3 | 1.00 | 8.30 |
| Sub Total | 1120.7 | | 825.7 |
| Delayed Oxidizer | | | |
| Ammonium Persulfate | 2.30 | 1.00 | 2.3 |
| Water | 56.00 | 0.00 | 0.0 |
| Sub Total | 58.30 | | 2.3 |
| Post Oxidizer | | | |
| t-butylhydroperoxide | 0.90 | 0.70 | 0.6 |
| Water | 23.00 | 0.00 | 0.0 |
| Sub Total | 23.90 | | 0.6 |
| Post Reducer | | | |
| Sodium metabisulfite | 0.90 | 1.00 | 0.9 |
| Water | 23.00 | 0.00 | 0.0 |
| Sub Total | 23.90 | | 0.9 |
| Post Addition | | | |
| NH4OH (28% NH3) | 0.0 | 0.00 | pH = 8 |
| Water (DI) | 0.0 | 0.00 | 0.0 |
| Sub Total | 0.0 | | 0.0 |
| TOTAL SUM | 1739 | | 870 |

TABLE 1-continued

| Latex Recipe | | | |
|---|---|---|---|
| Feed rates (mls/min) | Start | Stop | Rate |
| Monomer Feed 1 (rate1) | 0 | 30 | 2.00 |
| Monomer Feed 1 (rate1) | 30 | 210 | 5.89 |
| Delayed Oxidizer | 0 | 210 | 0.28 |
| Post Oxidizer | 240 | 300 | 0.40 |
| Post Reducer | 240 | 300 | 0.40 |
| Seed conc on monomer | | | 3.95% |
| Expected properties | | | |
| Total Solids (%) | | | 50.0% |
| Seed Surf on solids | | | 0.19% |
| Anionic surf on solids | | | 1.00% |
| Nonionic surf on solids | | | 1.00% |
| Total surf on solids | | | 2.18% |
| Oxidizer on solids | | | 0.53% |
| Post oxidizer on solids | | | 0.07% |
| Post reducer on solids | | | 0.10% |
| MAA on solids | | | 0.95% |

Acrylic Latex Procedure:

Add initial oxidizer to the initial charge in a stirred vessel at 75 C. When mixed, begin adding the monomer feed to stirred vessel. At the end of monomer feed, continue stirring for 30 minutes, and then begin post reducer and oxidizer feeds. Cool down to at least 30 C, adjust pH with ammonium hydroxide, and measure properties.

The surfactants are designated as primary or secondary. The primary surfactants are listed in the 1$^{st}$ surfactant column in Table 2 below. Secondary surfactants are alternate surfactants that can be added during the polymerization or post added. If they were post added after the polymerization was complete, the word "blend" is added in the tables below. The particle size data (Mv volume) was obtained using a Microtrac laser diffraction particle size analyzer.

Experimental Procedure for Freeze Thaw Test:

In order to assess rapidly a large number of latexes for freeze/thaw stability, the latexes were put into clear plastic 35×10 mm petri dishes with covers. The samples were placed into a negative 18 C freezer; the samples froze within 3 hours. After removal from the freezer, they were allowed to thaw at room temperature over one hour. A sample was judged to be freeze/thaw stable after that cycle if no visible change in its viscosity or consistency had occurred. If the sample (latex or paint) was unchanged after a cycle, it was placed back into the freezer to start another cycle. Testing was complete whenever a sample failed or survived five freeze/thaw stability cycles.

TABLE 2

| Example Latex | Tg (deg C.) | Surfactant (during polymerization) | % | 2nd Surfactant (during polymerization or blended after) | % | Number of Freeze Thaw Cycles | Mv |
|---|---|---|---|---|---|---|---|
| 3 | −5 | E-Sperse ® 704 | 1 | | | 0 | 168 |
| 4 | −5 | E-Sperse ® 704 | 1 | | | 0 | 289 |
| 5 | 5 | E-Sperse ® 704 | 1 | | | 0 | 173 |
| 6 | 15 | E-Sperse ® 704 | 1 | | | 0 | 146 |
| 7 | −5 | E-Sperse ® 704 | 1 | E-Sperse ® 703 blend | 2 | 0 | 168 |
| 8 | −5 | E-Sperse ® 704 | 1 | E-Sperse ® 703 blend | 2 | 0 | 289 |
| 9 | 5 | E-Sperse ® 704 | 1 | E-Sperse ® 703 blend | 2 | 0 | 173 |
| 10 | 15 | E-Sperse ® 704 | 1 | E-Sperse ® 703 blend | 1 | 0 | 146 |
| 11 | 15 | E-Sperse ® 704 | 1 | E-Sperse ® 703 blend | 2 | 5 | 146 |
| 12 | 5 | E-Sperse ® 704 | 1 | ERS 1689 blend | 1 | 0 | 173 |
| 13 | 5 | E-Sperse ® 704 | 1 | ERS 1689 blend | 2 | 0 | 173 |
| 14 | −5 | E-Sperse ® 704 | 1 | Example 1 | 1 | 0 | 202 |
| 15 | −5 | E-Sperse ® 704 | 1 | Example 1 | 2 | 0 | 190 |
| 16 | 5 | E-Sperse ® 704 | 1 | Example 1 | 1 | 5 | 171 |
| 17 | 5 | E-Sperse ® 704 | 1 | Example 1 | 2 | 5 | 177 |

TABLE 2-continued

| Example Latex | Tg (deg C.) | Surfactant (during polymerization) | % | 2nd Surfactant (during polymerization or blended after) | % | Number of Freeze Thaw Cycles | Mv |
|---|---|---|---|---|---|---|---|
| 18 | 15 | E-Sperse ® 704 | 1 | Example 1 | 1 | 5 | 220 |
| 19 | 15 | E-Sperse ® 704 | 1 | Example 1 | 2 | 5 | 177 |
| 20 | 5 | Example 2 | 1 | ERS 1689 | 1 | 0 | 180 |
| 21 | 5 | Example 2 | 1 | ERS 1689 + 1689 blend | 2 | 5 | 180 |
| 22 | 5 | Example 2 | 1 | 1% 703 blend | | 0 | |
| 23 | 5 | Example 2 | 1 | 2% 703 blend | | 0 | |

Examples 3-6 above show that E-Sperse® 704 at 1% did not impart any freeze/thaw stability to any latex, even the high Tg (15 C) latex.

Examples 7-11 show that the post polymerization addition of E-Sperse® 703 to the latexes of Examples 3-6 only improved freeze/thaw stability in the 15 C Tg latex. This shows that the higher Tg latex is easier to stabilize.

Examples 12 and 13 show that the addition of 1 or 2% of ERS 1689, known to be an excellent freeze/thaw stability additive, was insufficient to impart freeze/thaw stability to the E-Sperse® 704 5 C Tg latex.

Examples 14-19 show that the use of 1% Example 1 as the second polymerization surfactant was sufficient to impart at least five cycles of freeze/thaw stability to the 5 C and 15 C latexes. Example 1 has a structure similar to E-Sperse® 703 (POE 20 DSP) but has two reactive moieties on the hydrophobe end of the polymer. The reactivity of Example 1 appears to result in improved freeze/thaw stability.

Examples 20 and 21 show that Example 2, an anionic reactive surfactant, in combination with ERS 1689, gave good freeze/thaw stability while E-Sperse® 704 (non-reactive, but similar structure (POE 20 DSP sulfate)) in the same combination with ERS 1689 (Example 13) did not.

Examples 22 and 23 show that Example 2, an anionic surfactant, in combination with E-Sperse® 703, did not give good freeze/thaw stability. Presumably, ERS 1689 is a better freeze/thaw stability additive than E-Sperse® 703.

In the study in Table 3 below, latexes were made according to the above procedure at a Tg of 5 C with SLS and E-Sperse® 704 as primary surfactants in order to compare their contribution to freeze/thaw stability when Example 1 was used as the secondary surfactant. This was done to determine if E-Sperse® 704 imparted any extra freeze/thaw stability characteristics as compared to the commonly used surfactant, SLS.

TABLE 3

Freeze/thaw stability comparison of SLS and E-Sperse ® 704

| Example latex | Calculated Tg (deg C.) | Primary Surfactant (during polym) | % | Secondary Surfactant (during polym. or blended after) | % | Freeze Thaw Cycles | Particle size (nm) Mv |
|---|---|---|---|---|---|---|---|
| 24 | 5 | E-Sperse ® 704 | 1 | | | 0 | 173 |
| 25 | 5 | E-Sperse ® 704 | 1 | Example 1 | 0.5 | 0 | 166 |
| 26 | 5 | E-Sperse ® 704 | 1 | Example 1 | 1 | 5 | 171 |
| 27 | 5 | SLS | 1 | | | 0 | 145 |
| 28 | 5 | SLS | 1 | Example 1 | 0.5 | 0 | 164 |
| 29 | 5 | SLS | 1 | Example 1 | 1 | 5 | 161 |

Since freeze/thaw stability is obtained at 1% EXAMPLE 1 in both the E-Sperse® 704 and SLS recipes, it is readily apparent that E-Sperse® 704 does not confer added freeze/thaw stability characteristics over SLS, at least not as the primary surfactant in these recipes.

Comparison of E-Sperse® 704, Example 2, and SLS for Freeze Thaw Resistance:

Latexes with Example 2 as the primary surfactant produce freeze/thaw stability with ERS 1689 (Table 4). This occurs both with ERS 1689 at 2% added during the reaction and when half of the surfactant is blended in after the reaction. The use of SLS as the primary surfactant does not confer freeze/thaw stability when ERS 1689 is employed as the secondary surfactant.

TABLE 4

Effect of F/T on E-Sperse ® 704, Example 2, and SLS (ERS 1689 as secondary surfactant)

| Latex Reference | Calculated Tg (deg C.) | Primary Surfactant (during polym) | % | Secondary Surfactant (during polym. or blended after) | % | Freeze Thaw Cycles | Particle size (nm) Mv |
|---|---|---|---|---|---|---|---|
| 30 | 5 | E-Sperse ® 704 | 1 | ERS 1689 | 2 | 0 | 177 |
| 31 | 5 | Example 2 | 1 | ERS 1689 | 1 | 0 | 180 |

TABLE 4-continued

Effect of F/T on E-Sperse ® 704, Example 2, and SLS (ERS 1689 as secondary surfactant)

| Latex Reference | Calculated Tg (deg C.) | Primary Surfactant (during polym) | % | Secondary Surfactant (during polym. or blended after) | % | Freeze Thaw Cycles | Particle size (nm) Mv |
|---|---|---|---|---|---|---|---|
| 32 | 5 | Example 2 | 1 | ERS 1689 | 2 | 5 | |
| 33 | 5 | Example 2 | 1 | ERS 1689 + 1689 blend | 2 | 5 | 180 |
| 34 | 5 | SLS | 1 | ERS 1689 | 2 | 0 | 162 |

Upon examining the above data, it is apparent that the only time where freeze/thaw stability is obtained is when either Example 1 or Example 2 is used at concentrations of at least 1% in combination with other surfactants. It is believed that the capability of these materials to polymerize into the polymer backbone, along with their unique structure, allows for superior freeze/thaw stability characteristics in latexes.

Comparison of Surfactants for Freeze Thaw Resistance at Various Tg in Latexes and in Paint Paint Formulation:

The ingredients in Table 5 were added to a stainless steel beaker in the order listed using a high-speed disperser. A good grind was obtained. Next the letdown was made (except latex) using low speed on the same disperser. Very small volume mixtures of the paint base with latex were then made (~25 g). The paint was mixed for a further 15 minutes.

TABLE 5

| Flat Paint Formulation | | |
|---|---|---|
| Grind | Pounds | Gallons |
| Flat Paint Recipe | | |
| Water | 100 | 11.9 |
| Cellosize QP 4400 | 1 | 0.1 |
| Ammonia (28%) | 0.5 | 0.1 |
| Water | 40 | 4.8 |
| Tamol 165A | 17.6 | 2 |
| TRITON CF-10 | 2.2 | 0.3 |
| DrewPlus L-108 | 1 | 0.1 |
| Ti-Pure R-902+ | 206 | 6.2 |
| Minex 4 | 29 | 1.3 |
| Minex 10 | 143 | 6.5 |
| Grind Sub-total | 540.3 | 33.3 |
| Letdown | | |
| Water | 40 | 4.8 |
| Experimental latex (50% Wt) | 375 | 43 |
| ROPQAUE Ultra E 30% wt | 48.7 | 5.7 |
| DrewPlus L-108 | 1.5 | 0.2 |
| Ammonia (28%) | 3 | 0.4 |
| Total | 1096 | 100.1 |
| Formula Values: | | |
| Volume Solids: | 37% | |
| Density: | 11.2 | |
| Weight Solids: | 51% | |
| pH: | 8.3-9.3 | |
| Gloss: | | |
| 60 degree | 5 | |
| 85 degree | 7 | |

TABLE 5-continued

| Flat Paint Formulation | | |
|---|---|---|
| Grind | Pounds | Gallons |
| PVC: | 46% | |
| VOC: | <2 g/L | |

Cellosize® QP is a cellulosic polymer thickener available from the Dow Chemical company. Tamol® 165A is a pigment dispersant available from the Dow Chemical company. Triton® CF-10 is a surfactant available from DOW Chemical. DrewPlus® L-108 is a foam control agent available from Ashland Specialty Ingredients. Ti-Pure® R-902 is a titanium dioxide pigment available from Dupont. Minex® 4 and 10 are mineral oxides available from Unimin Specialty Minerals. ROPAQUE® Ultra E is a pigment available from DOW Chemical.

Tables 6, 7, 8, and 9 below show the effect on freeze/thaw stability of various combinations of anionic and nonionic surfactants on latexes with various Tg and the paints comprising them. For each example, the combination of either reactive anionic surfactant (Example 2) or non-reactive anionic surfactant (E-Sperse® 704), and reactive nonionic surfactant (Example 1) or non-reactive nonionic surfactant (ERS 1689) is noted. The values in these columns are the weight percentages of each surfactant required to achieve five cycles of freeze/thaw stability in the paint comprising the example latex. All latexes in a table were prepared from the same recipe, varying only in the amounts and type of surfactants used.

TABLE 6

Examples 35-42 Tg 5 C. Latex and Flat Paints

| Example latex | Example 2 | E-Sperse ® 704 | Example 1 | ERS 1689 | Tg | Mv | Latex FT cycles | Paint FT cycles |
|---|---|---|---|---|---|---|---|---|
| 35 | 0.25 | 0 | 0.25 | 0 | 5 | 169 | 0 | 5 |
| 36 | 0.50 | 0 | 0.50 | 0 | 5 | 273 | 5 | 5 |
| 37 | 1 | 0 | 0 | 0 | 5 | 150 | 0 | 5 |
| 38 | 1 | 0 | 0 | 2 | 5 | 175 | 5 | 5 |
| 39 | 1 | 0 | 0 | 3 | 5 | 150 | 5 | 5 |
| 40 | 0 | 1 | 1 | 0 | 5 | 171 | 5 | 5 |
| 41 | 0 | 1 | 0 | 1 | 5 | 173 | 0 | 5 |
| 42 | 0 | 1 | 0 | 5 | 5 | 173 | 5 | 5 |

Freeze/thaw stability may be realized at much lower surfactant usage levels when reactive anionic and nonionic surfactants are used in combination. Example 35 (all reactive surfactant) requires one quarter of the surfactant loading of Example 41 (no reactive surfactant), and similarly, Example 36 requires 1.0% total surfactant whereas Example 42 requires 6% total surfactant.

Advantages in surfactant reduction may also be realized when either an anionic reactive or reactive nonionic surfactant are used in combination with a nonreactive surfactant, though not as great as when a fully reactive surfactant system is used. For example, paint freeze/thaw stability is obtained when 1.0% of Example 2 surfactant is used (Example latex 37) compared with 2.0% required for E-Sperse® 704 (Example latex 41). In latex only testing, these same surfactants required 3.0% (Ex latex 38) compared to 6% (Ex latex 42). Similarly, comparing the latex in Example 40 with that of Example 42, both of which were prepared with E-Sperse® 704 non-reactive anionic surfactant, Example 40 required only 1% of the reactive nonionic (2% total surfactant) whereas the Example 42 latex required 5% non-reactive nonionic (6% total surfactant).

The paint data in Table 6 shows that significantly less surfactant is needed to produce freeze/thaw stability in flat latex paints than in the neat latex. This is expected since it is believed that latex/latex interactions cause freeze/thaw failure and with highly stabilized pigments that are present in paint interfering with latex/latex interactions, failure is less likely.

TABLE 7

Examples 43-49 Tg −5 Latex and Paints

| Example latex | Example 2 | E-Sperse ® 704 | Example 1 | ERS 1689 | Tg | Mv | Latex FT cycles | Paint FT cycles |
|---|---|---|---|---|---|---|---|---|
| 43 | 1 | 0 | 1 | 0 | −5 | 177 | 0 | 5 |
| 44 | 1 | 0 | 2 | 0 | −5 | 198 | 5 | 5 |
| 45 | 1 | 0 | 0 | 1 | −5 | 152 | 0 | 5 |
| 46 | 1 | 0 | 0 | 4 | −5 | 152 | 5 | 5 |
| 47 | 0 | 1 | 0 | 0 | −5 | 157 | 0 | 0 |
| 48 | 0 | 1 | 0 | 1 | −5 | 157 | 0 | 5 |
| 49 | 0 | 1 | 0 | 4 | −5 | 157 | 4 | 5 |

The paint data in Table 7 shows that more surfactant is needed to produce freeze/thaw stability in flat latex paints than in the higher Tg latexes in Table 6. Again, the paint prepared from latex incorporating only reactive surfactants (Example latex 44) requires much less total surfactant than the paint incorporating a latex with non-reactive surfactants (Example 49). Examples 44 and 46 show that the reactive nonionic surfactant is much more effective at imparting freeze/thaw stability than the non reactive nonionic.

TABLE 8

Examples 50-58 Tg −15 Latex and Paints

| Example latex | Example 2 | E-Sperse ® 704 | Example 1 | ERS 1689 | Tg | Mv | Latex FT cycles | Paint FT cycles |
|---|---|---|---|---|---|---|---|---|
| 50 | 0.50 | 0 | 0.50 | 0 | −15 | 187 | 0 | 0 |
| 51 | 0.50 | 0 | 0.50 | 2.5 | −15 | 187 | 0 | 5 |
| 52 | 0.50 | 0 | 0.50 | 4 | −15 | 187 | 5 | 5 |
| 53 | 1 | 0 | 0 | 0 | −15 | 169 | 0 | 0 |
| 54 | 1 | 0 | 0 | 3 | −15 | 169 | 0 | 5 |
| 55 | 1 | 0 | 0 | 5 | −15 | 169 | 5 | 5 |

TABLE 8-continued

Examples 50-58 Tg −15 Latex and Paints

| Example latex | Example 2 | E-Sperse® 704 | Example 1 | ERS 1689 | Tg | Mv | Latex FT cycles | Paint FT cycles |
|---|---|---|---|---|---|---|---|---|
| 56 | 2 | 0 | 2 | 0 | −15 | 169 | 5 | 5 |
| 57 | 0 | 1 | 0 | 3 | −15 | 157 | 0 | 5 |
| 58 | 0 | 1 | 0 | 4 | −15 | 157 | 5 | 5 |

The paint data in Table 8 shows that more surfactant is needed to produce freeze/thaw stability in flat latex paints at −15 C Tg than in the higher Tg latexes in Tables 6 or 7. Again, the paint prepared from latex incorporating only reactive surfactants (Example latex 56) requires less total surfactant than the paint incorporating latex with non-reactive surfactants (Example 58).

TABLE 9

Examples 59-65 Tg −35 Latex and Paints

| Example latex | Example 2 | E-Sperse® 704 | Example 1 | ERS 1689 | Tg | Mv | Latex FT cycles | Paint FT cycles |
|---|---|---|---|---|---|---|---|---|
| 59 | 2 | 0 | 2 | 0 | −35 | 176 | 0 | 5 |
| 60 | 1 | 0 | 3 | 0 | −35 | 202 | 0 | 5 |
| 61 | 1 | 0 | 5 | 0 | −35 | 187 | 5 | 5 |
| 62 | 1 | 0 | 0 | 4 | −35 | 156 | 0 | 5 |
| 63 | 1 | 0 | 0 | 5 | −35 | 156 | 5 | 5 |
| 64 | 0 | 1 | 0 | 4 | −35 | 160 | 0 | 5 |
| 65 | 0 | 1 | 0 | 7 | −35 | 160 | 5 | 5 |

Example 2 reactive anionic required 6% total surfactant compared to 8% with E-Sperse® 704 nonreactive anionic. The full reactive surfactant system of Example 61 used less total surfactant (6% compared to 8%) than the non-reactive system (Example 65).

The content of all references cited in the instant specifications and all cited references in each of those references are incorporated in their entirety by reference herein as if those references were denoted in the text While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

This application was filed on Oct. 21, 2012, by Isaac A. Angres, Reg. No. 29,765.

What is claimed is:

1. A aqueous coating composition having freeze thaw stability, comprising: at least one latex polymer derived from at least one monomer and a combination of a reactive surfactant of the formula:

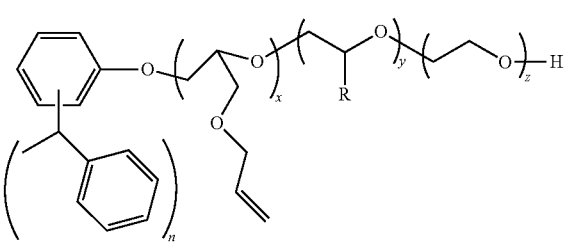

where R=CH$_3$ or CH$_2$CH$_3$, n=1, 2, or 3; x is 2-10, y is 0-200, and z is 4-200;
and a surfactant of the formula:

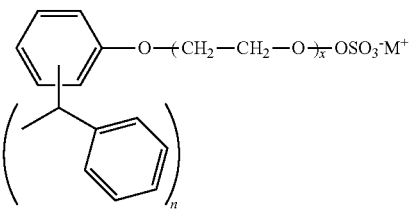

where n=2, x=20 and M$^+$ is NH$_4^+$.

2. The coating composition of claim 1 having five cycles of freeze-thaw stability.

3. The aqueous coating composition having freeze thaw stability of claim 1 wherein said z of Formula I is 5 to 60.

4. The aqueous coating composition having freeze thaw stability of claim 3 wherein said z of Formula I is 5 to 40.

5. The aqueous coating composition having freeze thaw stability of claim 1 further comprising at least one additional surfactant selected from the group consisting of nonionic, anionic, cationic and zwitterionic surfactants.

6. The aqueous coating composition having freeze thaw stability of claim 1 wherein said n=2.

7. A method for imparting freeze/thaw stability to a latex which method comprises conducting a latex forming polymerization with a surfactant mixture comprising:

(a) a reactive surfactant of the formula

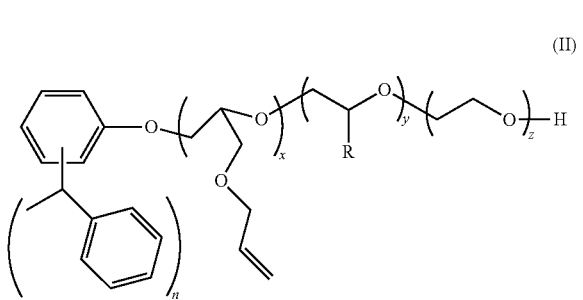
(II)

where R=CH$_3$ or CH$_2$CH$_3$, n=1, 2, or 3; x is 2-10, y is 0-200, and z is 4-200; and (b) a surfactant of the formula

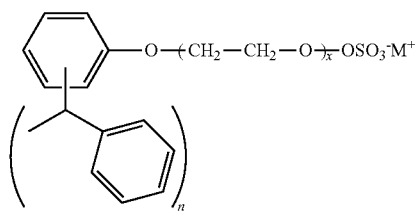

where n=2, x=20 and M$^+$ is NH$_4^+$.

8. The method of claim 7 wherein said latex has five cycles of freeze-thaw stability.

9. A method for imparting freeze/thaw stability to a latex which method comprises conducting a latex forming polymerization with a surfactant mixture comprising:

(a) a surfactant of the formula

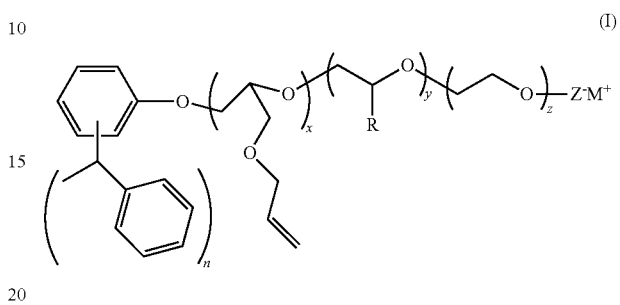
(I)

where R=CH$_3$ or CH$_2$CH$_3$, n=1, 2, or 3; x is 2-10, y is 0-200, and z is 4-200; Z can be either SO$_3^-$ or PO$_3^{2-}$, and M$^+$ is Na$^+$, K$^+$, NH$_4^+$, or an alkanolamine and (b) a surfactant of the formula

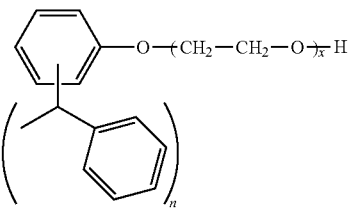

where n=3 and x=10.

* * * * *